United States Patent [19]

Jans

[11] Patent Number: 4,649,234

[45] Date of Patent: Mar. 10, 1987

[54] CIRCUIT ARRANGEMENT FOR TELECOMMUNICATIONS EXCHANGE SYSTEMS, PARTICULARLY TELEPHONE EXCHANGE SYSTEMS, COMPRISING INFORMATION PROCESSING SEQUENTIAL LOGIC SYSTEMS AND TRAFFIC MEASURING DEVICES

[75] Inventor: Herbert Jans, Neuried, Fed. Rep. of Germany

[73] Assignee: Siemens Aktiengesellschaft, Berlin and Munich, Fed. Rep. of Germany

[21] Appl. No.: 753,979

[22] Filed: Jul. 11, 1985

[30] Foreign Application Priority Data

Jul. 26, 1984 [DE] Fed. Rep. of Germany ....... 3427621

[51] Int. Cl.$^4$ .......................................... H04M 15/10
[52] U.S. Cl. ..................................... 379/138; 329/113
[58] Field of Search .................. 179/18 ES, 10, 8 A, 179/9, 7 R, 7 MM, 7.1 R, 7.1 TP

[56] References Cited

U.S. PATENT DOCUMENTS

| | | | |
|---|---|---|---|
| 4,151,375 | 4/1979 | Bambara et al. | 179/18 ES |
| 4,156,109 | 5/1979 | Kraushaar et al. | 179/8 A |
| 4,379,950 | 4/1983 | Ahmed | 179/18 ES |
| 4,497,978 | 2/1985 | Schoute et al. | 179/9 |

Primary Examiner—Gene Z. Rubinson
Assistant Examiner—David R. Schuster
Attorney, Agent, or Firm—Hill, Van Santen, Steadman & Simpson

[57] ABSTRACT

A circuit arrangement for telecommunications exchange systems, particularly telepone exchange systems, comprising information processing sequential logic systems and traffic measuring devices, is provided for handling processing requests. Processing requests are marked by a sequential logic systems as partially acceptable and input into a waiting list formed as a FIFO buffer. Processing requests marked not acceptable are input into a FIFO-LIFO memory which ejects a processing request in a FIFO mode when it is full and when the waiting list is at least partially filled and marks them as not acceptable, but marks processing requests as acceptable and outputs the same to the waiting list in the LIFO mode when the waiting list is empty or nearly empty.

8 Claims, 1 Drawing Figure

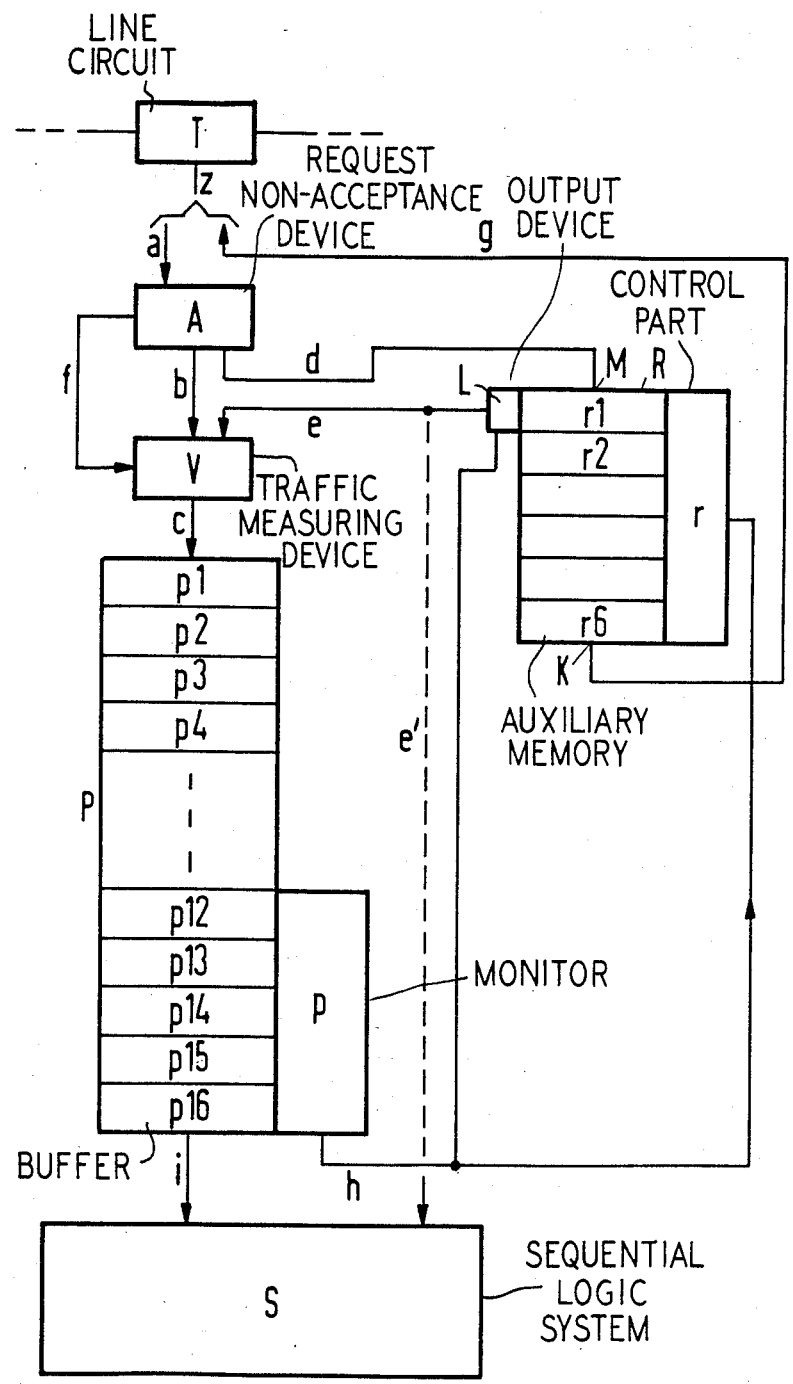

CIRCUIT ARRANGEMENT FOR TELECOMMUNICATIONS EXCHANGE SYSTEMS, PARTICULARLY TELEPHONE EXCHANGE SYSTEMS, COMPRISING INFORMATION PROCESSING SEQUENTIAL LOGIC SYSTEMS AND TRAFFIC MEASURING DEVICES

BACKGROUND OF THE INVENTION

1. Field of the Invention

The present invention relates to a circuit arrangement for telecommunications exchange systems, particularly telephone exchange systems, comprising central and/or sub-central information processing sequential logic systems having a limited performance capability with respect to the information processing capacity, and comprising buffers preceding the sequential logic systems which equalize the information processing load of the sequential logic systems and, for this purpose, serve for a temporary acceptance of information processing requests, and comprising traffic measuring devices for recognizing information processing traffic overloads of a respective sequential logic system and for averting such overloads by way of request deviation devices influenced by the traffic measuring devices, the request deviation devices quantitatively dividing the incoming processing requests into, on the one hand, processing requests to be accepted and to be ordinarily supplied to the respective buffer and, on the other hand, processing requests not supplied to the buffer.

2. Description of the Prior Art

A circuit arrangement of the type generally set forth above is disclosed in the periodical "IEEE Transaction on Communications" September, 1973, pp. 1027 et seq. A buffer for information processing requests is generally constructed as a FIFO memory. This means that the information processing requests are sequentially output therefrom in the same sequence in which information processing requests are successively supplied thereto, in other words a first in-first out memory. In a circuit arrangement of the type set forth above, assume that the information processing requests are a matter of call-setup jobs. These arrive from subscriber stations or via trunk lines. The information processing requests on the part of subscriber stations can be a matter of a subscriber call initiating the set-up of a connection or can also be a matter of subsequently output dial identifiers which may correspond to the individual numerals of a telephone number. Information processing requests which arrive from a line terminating circuit of a trunk line occupied in a incoming manner can be a matter of a switch identifier of an incoming occupation or can be a matter of incoming selection identifiers. When a trunk line is occupied in the outgoing manner, then the end of selection identifier, the start character and the charge call counting pulses can arrive in the direction opposite that of the call set-up. These switch identifiers therefore arrive in a line terminating circuit of a trunk line occupied in an outgoing manner and likewise result in information processing requests when the respectively occupied line terminating circuit outputs toward the appertaining information processing sequential logic system.

Given central and/or sub-central information processing sequential logic systems in a circuit arrangement of the type initiall set forth, therefore, information processing requests successively arrive whose occurrence is randomly conditioned and depends on the respective subscriber behavior of each of the participating subscribers. The information processing load accordingly represents a constantly fluctuating quantity. The appertaining central and/or sub-central information processing sequential logic systems which now come of course, have a limited performance capability or call handling capacity with respect to the information processing capacity are adapted to the respectively occurring requirements in view of their performance capability. Such an adaptation of the information processing capacity to the constantly fluctuating information processing load is subject to various commands. First, an optimally high work load of a central and/or sub-central information processing sequential logic system should be achieved; this serves the purpose of an optimally high efficiency. Secondly, it must be guaranteed that the need for information processing capacity is satisfied; the proportion of connections which cannot be established due to the overload of central and/or sub-central information processing sequential logic systems should be as low as possible.

In order to meet the above requirements, the aforementioned buffers are provided in circuit arrangements of the type initially mentioned, these buffers seeing to it in a manner at the command of a person skilled in the art given fluctuating need of information processing capacity per time unit that the information processing requests are processed by the central and/or sub-central information processing sequential logic systems in succession and uniformly with respect to the information processing performance. This equalizing effect is all the more pronounced the larger such a buffer is designed and the greater the maximum waiting times between input of a respective information processing request into the buffer and fetching the same therefrom.

However, upward limits are, in turn, also placed on this waiting time. For example, a subscriber who has initiated a subscriber call by closing his subscriber line loop via his subscriber station in order to have a connection established by selecting corresponding numbers of a subscriber call number should at most have to wait only a specific time, for example one second, before he receives the dial tone after picking up the handset at his subscriber station. When he then successively outputs the various numerals of the subscriber call number he has selected, then, further, the individual numerals must be accepted at the right time by the central and/or sub-central information processing sequential logic systems. It must be guaranteed, on the one hand, that one numeral is always accepted before the next numeral arrives. In addition, it is usually even required that a numeral is accepted during the time in which it is output by the dialing subscriber, for example given audio frequency or multiple code selection methods. When it is a matter of switch identifiers which arrive in a line termination circuit of a trunk line occupied incoming, then, for example, the occupancy identifier must be processed before the first, incoming numeral of a selected subscriber call number arrives for processing.

For the reasons set forth above, therefore, the requirement also derives that the waiting time arising for individual information processing requests may not exceed a defined, upper limit. Therefore, traffic measuring devices are provided in circuit arrangements of the type set forth above, these traffic measuring devices influencing the request deviation or non-acceptance devices and effecting that the waiting information processing requests are temporarily and/or in part not accepted. Given non-acceptance of the information processing requests, it is effected in the subscriber-associated or call-associated switch device, for example in a subscriber line circuit, selection reception set, local call switching circuit or line termination circuit of a trunk line occupied incoming or outgoing, that, on the one hand, a corresponding audible signal, for example a busy signal, is transmitted to the calling subscriber and that, on the other hand, an acceptance of further switch identifiers or, respectively, their forwarding to the central and/or sub-central information processing sequential logic system is suppressed.

As already explained, the incidence of information processing requests is irregular to a certain degree, i.e. statistically distributed. This depends, on the one hand, on the individual subscriber behavior. However, an equalization in the sense of a random distribution occurs to a certain degree in a known manner due to the multitude of participating subscribers. However, random load discontinuity can thereby also occur. In addition, however, such load discontinuities can also arise due to influences shared by the group of subscribers, for example due to natural events, catastrophies, the beginning or end of a television program, times at which fee schedules change, and the like. It can also occur that the buffer is temporarily constantly full and that information processing requests are partially rejected to a corresponding degree for that time, that, i.e. call set-up of a request can partially not be fulfilled even though the connecting circuits in the switching matrix networks and the groups of trunk lines or, respectively, channels would be free. The buffer can also become full for a certain time due to internal system bottlenecks such as, for example, given temporary outage of sub-components of the same system, this likewise leading to the non-acceptance of information processing requests.

SUMMARY OF THE INVENTION

The object of the present invention is to exploit the limited call handling capacity, with respect to the information processing capacity, of central and/or sub-central information processing sequential logic systems; it is important in this context that call setup requests which cannot be fulfilled due to momentarily inadequate call handling capacity with respect to the information processing capacity of the sequential logic systems are, insofar as possible, not first affected by an information processing non-acceptance when some information processing operations have already been executed for this same call setup. It is obvious that information processing capacity already claimed would thereby be lost. Of note in conjunction therewith and with the above object is that, on a case-by-case basis with increasing waiting time of an information processing request for processing of the appertaining information by the respective sequential logic system, the probability increases that a calling subscriber would not continue his intended call setup (for example because he has run out of patience waiting for the dial tone), or that, in the course of a call setup, a selection identifier has overtaken a preceding selection identifier or a preceding switch identifier (for example, occupancy identifier in a line termination circuit of an incoming trunk line), and that a call setup can no longer be executed for technical reasons because the appertaining selection identifiers or, respectively, switch identifiers did not arrive for processing by the sequential logic system at the right time.

The above object is achieved, according to the present invention, in that the information processing requests not directly supplied to a buffer are supplied to a FIFO memory which functions, on the one hand, as a FIFO memory insofar as it is not full and insofar as processing requests still reside stored in the buffer, in particular that there is at least still one processing request present and which then marks the processing requests it has ejected as not acceptable and which, on the other hand, functions as a LIFO (last in-first out) memory insofar as no processing requests or only a few processing requests (for example 1) still reside stored in the buffer, whereby processing requests taken therefrom via the LIFO output are marked as acceptable and/or are immediately supplied to a sequential logic system for processing.

Advantageously achieved by practicing the present invention is that, in the case of a sudden drop in the information processing load, when, therefore, the buffer was first constantly full, but then become empty or nearly empty within a relatively short time, some information processing requests which had first been marked as not acceptable are subsequently marked as to be additionally accepted. It is thereby provided that, of these information processing requests first marked as non-acceptable, those are subsequently accepted with priority (i.e. marked as acceptable) which still have the relatively best chances for a successful continuation of the respective call setup because of the waiting time that has already elapsed. Those information processing requests first marked as non-acceptable have the best chances in which the shortest respective waiting times have passed up to the appertaining time.

BRIEF DESCRIPTION OF THE DRAWING

Other objects, features and advantages of the invention, its organization, construction and operation will be best understood from the following detailed description, taken in conjunction with the accompanying drawing on which there is a single figure of a schematic representation of apparatus for practicing the invention.

DESCRIPTION OF THE PREFERRED EMBODIMENTS

The following description is based on a circuit arrangement shown in the German published application No. 33 28 571 and described therein in great detail. As described in that application, a circuit arrangement for telecommunications exchange systems, particularly for telephone exchange systems, comprises central and/or sub-central information processing sequential logic systems with a limited call handling capacity with respect to the information processing capacity. This publication is fully incorporated herein by reference. The buffer memories preceding the sequential logic systems which equalize the information processing load of the sequential logic systems and, for this purpose, serve for a temporary acceptance of information processing requests, and with traffic measuring devices for the recognition of information processing traffic overloads of a respective sequential logic system and for the aversion of such overloads by way of request non-acceptance devices influenced by the traffic measuring devices, these requests non-acceptance devices quantitatively dividing the incoming processing requests into acceptable processing requests which, accordingly, are supplied to the respective buffer and into processing requests not supplied to the buffer.

The lower part of the drawing indicates an information processing sequential logic system S. A multitude of such information processing sequential logic systems is already known. It can thereby be a matter of a sub-central, as well as of a central, information processing sequential logic system. This sequential logic system can, for example, be a control unit in a centrally controlled or sub-centrally controlled telephone system which accepts call selection identifiers and switch identifiers required for every call to be established and maintained and, on the basis of these identifiers, works out all control instructions which are required for setting up and maintaining each of these calls.

The upper portion of the drawing illustrates the subscriber-associated or call-associated switch device T. This can be a matter of a subscriber line circuit or a line terminating circuit of a trunk line and can also be a local call switching circuit, and inter-exchange circuit or the like. Trunk circuits can also be realized by way of corresponding trunk channels. Given subscriber line circuits, therefore, it is a matter of subscriber-associated switch devices, in contrast whereto the other cited devices are a matter of call-associated switch devices.

Switch identifiers and selection identifiers can arrive over all of the aforementioned switch devices. These switch identifiers are, for example, a matter of the subscriber call given subscriber line circuits, of the occupancy identifier given occupiable line terminating circuits, etc. The switch identifiers, further, are also a matter of the end of selection identifier, of the busy signal, of the beginning character, of the counting pulses and the like. In addition to the switch identifiers, selection identifiers are also to be processed, these being composed of the individual numerals of a multi-numeral subscriber call number. All of these switch identifiers and selection identifiers arrive in the subscriber-associated and call-associated switch devices and require a processing (subscriber-associated and/or call-associated) by the sequential logic system S.

An interrogation device is in communication, in a known manner, with the subscriber-associated and/or call-associated switch device T, this interrogation device continuously interrogating the switch device for the appearance of switch identifiers or, respectively, selection identifiers, for example according to the principle of "last look" (cf. Rechnergesteuerte Vermittlungssysteme", Peter Gerke, Springer-Verlag, Berlin/Heidelberg/New York, 1972) in order to conduct the same to the sequential logic system S. Each of the switch identifiers is fed to the sequential logic system S via the information paths a, b, c and i as an information processing request. Among other things, these processing requests comprise an information regarding the originating location of the respective information. This, for example, can be a subscriber line circuit respectively permanently assigned to a specific subscriber station or can be a specific switch device of the call-associated switch devices.

With respect to the information processing capacity, the central and/or sub-central information processing sequential logic systems have a limited call handling capacity. This, as known, is a question of the technical and economic expense and of its optimum exploitation. Since the information processing load of a central or sub-central sequential logic system is always subject to fluctuations which are caused by influences in the behavior of the participating subscribers, but which can also stem for influences identically affecting the appertaining subscribers, a buffer P is disposed preceding the sequential logic system S, the processing requests being input into the buffer P via the information path c in the sequence of their appearance and being called therefrom successively by the sequential logic system S via the information path i. The buffer is constructed of a plurality of memory lines p1-p16. Each memory line serves for receiving a processing request. The individual processing requests are forwarded downwardly in the buffer P from the uppermost memory line p1 from memory line-to-memory line and connect gap-free down to the lowest memory line p16. (This principle can also be technologically realized in some other, analogous manner). Among other things, each of these processing requests comprises particulars regarding originating location or, respectively, destination location and the information which are respectively applied for processing.

The information processing requests supplied to the buffer by the information path c traverse, among other things, a traffic measuring device V. In a manner known per se, this counts the information processing requests running through per unit time; it therefore measures the traffic devolving onto the sequential logic system S, i.e. the quantity of information processing requests in relationship to the time interval within which the same appear.

Before the information processing requests traverse the traffic measuring device V, they traverse a request non-acceptance device A. In a manner known per se, this device has the job of, given too great a number of information processing requests for the appertaining sequential logic system, seeing to it that a portion of these requests is rejected from the very outset; for, when the information processing load which devolves onto the sequential logic system S lie significantly above the information processing capacity of the sequential logic system, it is expedient to eliminate some of the pending information processing requests from the very outset in order to provide the subscribers affected by this with a signal, for example, the busy signal, as soon as possible so that these subscribers exert no further useless effort for establishing call which they have requested. In addition, the German application cited above also discloses the possibility of providing the appertaining measures for traffic measurement at a central location, i.e. at a central sequential logic system, but of providing the non-acceptance device at a decentralized location, for example, in group control units in order to accomplish a rejection of information processing requests as they arise insofar as possible.

As a consequence of great load decreases wherein, therefore, the crush of information processing requests suddenly drops, it can occur that the buffer P suddenly becomes empty. As has already been explained, the buffer can likewise not be made arbitrarily large. This, among other things, also involves the fact that the size of the buffer also has an influence on the duration of the maximum waiting time which arises for the processing of the information processing requests.

The supply of information processing requests stored in the buffer P, therefore, should not be at too high because the individual time interval from the occurrence of an information processing request until the corresponding results are supplied could become inadmissibly long. On the other hand, however, in the operating situation that the non-acceptance device is momentarily set to rejecting a certain part of the information processing requests incoming overall from the very outset, great negative load fluctuations, i.e. load collapses, could lead to the fact that the buffer P suddenly becomes completely empty and the sequential logic system briefly remains without information processing requests. As a result thereof, the exploitation of the appertaining sequential logic system in the time interval between the load collapse and the follow-up of the non-acceptance device by the traffic measuring device to lower rejection rates would be unfavorably deteriorated in that the sequential logic system has free processing capacity, whereas a portion of the information processing requests is still rejected (inertia of the control).

For alleviation, an auxiliary memory R having a total of six memory lines r1–r6 is provided. The non-acceptance device A has the job of rejecting a part of the information processing requests in the overload situation. To this end, the traffic measuring device V assigns a certain percentage of information processing requests which are to be rejected from the very outset to the non-acceptance device A via the memory path f. In a known manner, the non-acceptance device A contains a counting device with whose assistance it accomplishes this rejection. It one assumes, for example, that the traffic measuring device B identifies that ten percent of the arising information processing requests are to be rejected in a given operating situation, then it informs the non-acceptance device A of this percentage via the information path f. This counts the information processing requests incoming via the information path a; of respectively ten information processing requests, the non-acceptance device supplies nine via the information path b to the traffic measuring device V from which they are forwarded via the information path c to the buffer P. Every tenth information processing requests, however, is supplied by the non-acceptance device A via the information path d to the auxiliary memory R.

The auxiliary memory R is constructed as a shift register according to the principle of a stack. An information processing request emitted thereto is first written into the memory line r1. When a further information processing request from the non-acceptance device A arrives via the information path d, then, as a result, the information processing request first stored in the memory line r1 is shifted into the memory line r2. The newly arrived information processing request is then written into the memory cell r1. Processing requests incoming successively via the information path d are shifted in this manner in the auxiliary memory R constructed as a shift register (stack register), namely finally down to the lowest memory line r6.

When the auxiliary memory R is full, i.e. information processing requests are stored in all of its memory lines r1–r6, and a further information processing request arrives from the non-acceptance device A via the information d, then the auxiliary memory R ejects the information processing requests stored in the memory line r6 via the output K and marks it as non-acceptable. It proceeds via the information path g to the subscriber-associated or call-associated switch device; it can also be provided that only a part of the information processing request is transmitted via the information path g. What is essential is that the message that the information processing request has been rejected proceeds to the subscriber-associated or call-associated switch device. In any case, however, the last information processing request in the operating situation under consideration is ejected via the output K, is therefore stepped out of the memory line r6, and the further information processing requests stored in the memory line r1–r5 are respectively shifted by one memory line in the direction from the input M to the output K of the auxiliary memory R. These shift operations in the auxiliary memory R are accomplished with the assistance of a control part r in a known manner. In view of the input M and the output K, the auxiliary memory R is designed as a FIFO memory and functions according to this principle.

The information processing requests not directly supplied from the non-acceptance device A to the buffer P via the traffic measuring device V are therefore supplied to the auxiliary memory R. It functions as a FIFO memory when it is full and when processing requests still reside stored in the buffer P. This latter fact is perceived by a monitoring device p of the buffer P. As soon as the number of information processing requests stored in the buffer P falls below a specific number, for example 1 or 2, the monitoring device p forwards the signal by way of the information path h to the auxiliary memory R, whereupon its control part r is initiated to reverse the shift direction within the auxiliary memory R constructed as a shift register. This shift direction therefore now proceeds from the lowest memory line r6 towards the upper memory line r1.

The signal output by the monitoring device p of the buffer p and forwarded via the information path h also proceeds to an output device L which is provided in conjunction with the memory line r1 of the auxiliary memory R. On the basis of the signal which it receives, the removal device takes the information processing request last transmitted to the auxiliary memory R by the non-acceptance device A and transmits the same by way of the path e and the traffic measuring device V to the buffer P. Therefore, this information processing request has likewise been subsequently marked as acceptable. There is also the possibility of supplying or offering this information processing request directly to the sequential logic system S via the path e′, i.e. while bypassing the buffer P.

Insofar as the number of information processing requests stored in the buffer P falls below the specific, lower limit value, therefore, the monitoring device p emits the signal by way of which, first, the shift direction of the auxiliary memory R, a shift register, is inverted in the specific manner and by means of which, secondly, information processing requests are successively taken from the memory line r1 in succession and supplied to the sequential logic system S either directly or via the buffer P. Given the reversal of the shift direction of the shift register R under consideration, the control portion r thereof executes the shift events in a known manner such that the information processing requests stored in the memory cell r1–r6 connect toward the top.

The buffer memory R, therefore, is a FIFO-LIFO memory which can operate both as a FIFO memory and as a LIFO memory. It functions as a FIFO memory insofar as it itself is full and insofar as processing requests still reside stored in the buffer P. It then marks the processing requests it has ejected as being non-acceptable.

However, the auxiliary memory R functions as a LIFO memory insofar as no information processing requests, or only very few information processing requests, still reside stored in the buffer P, whereby the information processing requests taken therefrom via the LIFO output L are marked as acceptable and/or directly supplied to the sequential logic system S for processing.

It can be provided that the degree of filling of the buffer below which informationiprocessing requests are also taken via the LIFO output L of the auxiliary memory R is established by a plurality of information processing requests stored in the buffer P which is identical to the plurality of information processing requests which can be stored in the auxiliary memory R. In this case, therefore, the monitoring device p would output the signal via the information path h as soon as the plurality of information processing requests stored in the buffer P reaches and/or falls below, in this case, six. Dependent thereon in this case, therefore, the control parts r of the auxiliary memory R would switch the latter from its FIFO function into its LIFO function. When the number of information processing requests stored in the buffer P again exceeds the fixed limit value, then the signal transmitted via the signal path h is again removed (or, respectively, a signal having the opposite significance and effect is transmitted) and the shift direction within the shift register auxiliary memory R is again reversed, i.e. information processing requests are shifted from the memory line r1 in the direction towards the memory line r6.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a circuit arrangement for telecommunications exchange systems, particularly telephone exchange systems, of the type which includes an information processing sequential logic system having a limited call handling capacity with respect to its information processing capacity, in which a buffer precedes the sequential logic system and serves for a temporary acceptance of information processing requests, in which a traffic measuring device is connected to the buffer for recognizing information processing traffic overloads of the sequential logic system and for averting such overloads by way of a request rejection device preceding the traffic measuring device, the request rejection device quantitatively dividing the incoming processing requests into acceptable processing requests which are supplied to the buffer and into unacceptable processing requests which are not supplied to the buffer, the improvement therein comprising:
    a first monitor connected to the buffer and operable to monitor the available buffer capacity;
    a first in-first out-last in-first out (FIFO-LIFO) memory connected to the request rejection device and to said first monitor and to the traffic measuring device and operable as a FIFO memory in response to being full and processing requests are stored in the buffer to mark processing requests it has rejected as non-acceptable, and operable as a LIFO memory in response to a predetermined number of processing requests residing in the buffer to output processing requests and mark the same as acceptable.

2. The improved circuit arrangement of claim 1, wherein said memory comprises a LIFO output connected to the buffer via the traffic measuring device.

3. The improved circuit arrangement of claim 2, wherein:
    the degree of filling of the buffer below which processing requests are also taken by the LIFO output is established by a plurality of processing requests stored in the buffer which is equal to the plurality of processing requests storable in the FIFO-LIFO memory.

4. The improved circuit arrangement of claim 2, wherein:
    the degree of filling of the buffer below which processing requests are also taken by the LIFO output is established by a plurality of processing requests stored in the buffer which is approximately equal to the plurality of processing requests storable in the FIFO-LIFO memory.

5. The improved circuit arrangement of claim 1, wherein:
    said FIFO-LIFO memory comprises a shift register comprising a FIFO output and operable to eject processing requests via said FIFO output when said FIFO-LIFO memory is full in response to a further processing requests from the request rejection device.

6. The improved circuit arrangement of claim 5, wherein:
    said shift register comprises a plurality of memory elements; and
    said LIFO output of said shift register is connected to the memory element connected to the request rejection device.

7. The improved circuit arrangement of claim 1, wherein:
    said memory comprises a shift register including a LIFO output and a FIFO output and is selectively operable to shift stored processing requests toward either of said outputs.

8. The improved circuit arrangement of claim 7, wherein:
    a shift processing requests in the direction from said FIFO output towards said LIFO output occurs each time a processing requests is taken from said LIFO output.

* * * * *